United States Patent
Donovan

(10) Patent No.: US 9,423,821 B2
(45) Date of Patent: *Aug. 23, 2016

(54) METHOD AND APPARATUS FOR SETTING A FREQUENCY OF A CLOCK SIGNAL FOR A BUS BASED ON A NUMBER OF REQUESTS ASSERTED TO TRANSFER DATA ON THE BUS

(71) Applicant: Marvell International Ltd., Hamilton (BM)

(72) Inventor: Timothy J. Donovan, Livermore, CA (US)

(73) Assignee: Marvell International Ltd., Hamilton (BM)

( * ) Notice: Subject to any disclaimer, the term of this patent is extended or adjusted under 35 U.S.C. 154(b) by 312 days.

This patent is subject to a terminal disclaimer.

(21) Appl. No.: 14/065,879

(22) Filed: Oct. 29, 2013

(65) Prior Publication Data

US 2014/0059374 A1    Feb. 27, 2014

Related U.S. Application Data

(63) Continuation of application No. 13/632,551, filed on Oct. 1, 2012, now Pat. No. 8,572,419, which is a continuation of application No. 12/645,840, filed on Dec. 23, 2009, now Pat. No. 8,281,170, which is a continuation of application No. 10/845,028, filed on May 13, 2004, now Pat. No. 7,640,446.

(60) Provisional application No. 60/506,797, filed on Sep. 29, 2003, provisional application No. 60/551,876, filed on Mar. 10, 2004.

(51) Int. Cl.
*G06F 1/08* (2006.01)
*G06F 1/32* (2006.01)

(52) U.S. Cl.
CPC ............... *G06F 1/08* (2013.01); *G06F 1/3203* (2013.01); *G06F 1/324* (2013.01); *Y02B 60/1217* (2013.01)

(58) Field of Classification Search
CPC ......... G06F 1/08; G06F 1/3203; G06F 1/324; Y02B 60/1217
See application file for complete search history.

(56) References Cited

U.S. PATENT DOCUMENTS 6,185,692 B1    2/2001    Wolford
6,363,445 B1    3/2002    Jaddeloh
6,460,125 B2    10/2002   Lee et al.
(Continued)

OTHER PUBLICATIONS

ANSI/IEEE Std. 802.11, 1999 Edition; Part 11: Wireless LAN Medium Access Cntrol (MAC) and Physical Layer (PHY) Specifications; Information technology—Telecommunications and information exchange between systems—Local and metropolitan area networks—Specific requirements; pp. 1-512.
(Continued)

*Primary Examiner* — Thuan Du

(57) ABSTRACT

An integrated circuit includes a generator. The generator, based on a summation signal, generates a clock signal having a frequency. Multiple devices generate respective requests. Each of the requests requests transfer of data on a bus. Each of the devices is configured to, based on the frequency of the clock signal, transfer the data for the corresponding request on the bus. A summer receives the requests and based on a number of the requests being in an asserted state during a first period of time, generates the summation signal. A first module, based on the summation signal, increases a second period of time that a first request is in an asserted state. The second period of time is increased to include or overlap the first period of time. The summer, as a result of the increase, generates the summation signal further based on the first request.

20 Claims, 9 Drawing Sheets

(56) References Cited

U.S. PATENT DOCUMENTS

| | | | |
|---|---|---|---|
| 6,546,496 B1 | 4/2003 | Wang et al. |
| 6,564,329 B1 | 5/2003 | Cheung et al. |
| 6,775,344 B1 | 8/2004 | Buhler et al. |
| 6,970,936 B2 | 11/2005 | Fields et al. |
| 7,093,152 B2 | 8/2006 | Shikata et al. |
| 7,093,153 B1 | 8/2006 | Witek et al. |
| 7,114,086 B2 | 9/2006 | Mizuyabu et al. |
| 7,231,477 B2 | 6/2007 | Toyokura |

OTHER PUBLICATIONS

IEEE P802.11g/D8.2 Apr. 2003 (Supplement to ANSI/IEEE std. 802.11 1999 (Reaff 2003) Draft Supplement Standard for Part 11: Wireless LAN Medium Access Control (MAC) and Physical Layer (PHY) Specifications; Information technology—Telecommunications and information exchange between systems—Local and metropolitan area networks—Specific requirements; Further Higher Data Rate Extension in the 2.4 GHz Band; pp. 1-69.

IEEE Std. 802.11 b; Supplement to IEEE Standard for Information technology—Telecommunications and information exchange between systems—Local and metropolitan area networks—Specific requirements; Part 11: Wireless LAN Medium Access Control (MAC) and Physical Layer (PHY) specifications: Higher-Speed Physical Layer Extension in the 2.4 GHz Band; Approved Sep. 16, 1999; pp. 1-89.

IEEE Std. 802.11 b-1999/Cor Jan. 2001;1EEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 2: Higher-speed Physical Layer (PHY) extension in the 2.4 GHz band—Corrigendum 1; pp. 1-15.

IEEE Std. 802.11a-1999; Supplement to IEEE Standard for Information Technology—Telecommunications and information exchange between systems—Local and metropolitan area networks—Specific requirements; Part: 11 Wireless LAN Medium Access Control (MAC) and Physical Layer (PHY) specifications; High-speed Physical Layer in the 5 GHz Band; pp. 1-83.

IEEE Std. 802.16; IEEE Standard for Local and metropolitan area networks; Part 16: Air Interface for Fixed Broadband Wireless Access Systems; Apr. 8, 2002; pp. 1-322.

IEEE Std. 802.16a; IEEE Standard for Local and metropolitan area networks; Part 16: Air Interface for Fixed Broadband Wireless Access Systems—Amendment 2: Medium Access Control Modifications and Additional Physical Layer Specifications for 2-11 GHz; Apr. 1, 2003; pp. 1-292.

METHOD AND APPARATUS FOR SETTING A FREQUENCY OF A CLOCK SIGNAL FOR A BUS BASED ON A NUMBER OF REQUESTS ASSERTED TO TRANSFER DATA ON THE BUS

CROSS-REFERENCE TO RELATED APPLICATIONS

This application is a continuation of U.S. patent application Ser. No. 13/632,551 (now U.S. Pat. No. 8,572,419), filed Oct. 1, 2012, which is a continuation of U.S. patent application Ser. No. 12/645,840 (now U.S. Pat. No. 8,281,170), filed Dec. 23, 2009, which is a continuation of U.S. patent application Ser. No. 10/845,028 (now U.S. Pat. No. 7,640,446), filed May 13, 2004, which claims the benefit of U.S. Provisional Application No. 60/506,797, filed Sep. 29, 2003, and U.S. Provisional Application No. 60/551,876, filed Mar. 10, 2004. The entire disclosures of the applications referenced above are incorporated herein by reference.

FIELD

The present invention relates to wireless network devices, and more particularly to reducing power dissipation in wireless network devices.

BACKGROUND

Laptop computers, personal digital assistants (PDAs), and other mobile devices often incorporate wireless local area network (WLAN) technology that typically operates using battery power. Therefore, it is important to minimize power dissipation in mobile devices to preserve battery life. Sometimes WLAN circuits are implemented as a system-on-chip (SOC).

Referring now to FIG. 1, an SOC 10 for a wireless network device includes modules 12 that communicate with each other over a system bus 14. The modules 12 include memory modules, processors, host interfaces, peripheral interfaces, local area network (LAN) interfaces, and/or other modules. The wireless network device may communicate with other external devices. For example, the wireless network device may communicate with an external radio frequency (RF) transmitter. Since the modules 12 communicate through a common system bus 14, most of the modules 12 are clocked at the same rate as the system bus 14 or at rates that are derived from the system bus 14 rate.

Only one of the modules 12 is allowed to access the system bus 14 at a given time. Since more than one of the modules 12 may simultaneously attempt to use the system bus 14, a bus arbiter module 16 determines which of the modules 12 has permission to use the system bus 14 at a given time. When one of the modules 12 requires use of the system bus 14, the module 12 requests permission from the bus arbiter module 16. The modules 12 request permission by asserting request signals 18 that are transmitted to the bus arbiter module 16.

Referring now to FIG. 2A, a request signal 26 from a requesting module remains high (or low) when the requesting module does not require use of the system bus 14. When the requesting module requires use of the system bus 14, the requesting module transitions to low (or high). During a write operation, the request signal 26 typically remains asserted until the end of the transaction. The bus arbiter module 16 detects the request signal 26 and instructs a target module to assert an acknowledge signal 28 when the requesting module is free to use the system bus 14.

Once the target module asserts the acknowledge signal 28, the requesting module begins transmitting data to the target module following a single clock cycle delay. At the end of the write transaction, the request signal 26 will transition to high (or low).

Referring now to FIG. 2B, in other bus architectures, the request signal 30 will transition to high (or low) when the acknowledge signal 32 is received. In this case, a last signal 34 is asserted to indicate the end of the transaction.

Referring now to FIG. 2C, during a read transaction, a request signal 36 typically does not remain asserted during the entire transaction. When the requesting module requires use of the system bus 14, the module asserts the request signal 36 by transitioning to low (or high). The bus arbiter module 16 detects the request signal and instructs the target module to assert an acknowledge signal 38. During a read transaction, it typically takes the target module time to retrieve the requested data. Therefore, the acknowledge signal 38 is only asserted for a single clock cycle.

At the end of the clock cycle both the request signal 36 and the acknowledge signal 38 transition to high (or low). This allows other modules 12 in the SOC 10 to use the system bus 14 while the target module retrieves the requested data. The target module asserts a read valid signal 40 to request permission to use the system bus 14. After the bus arbiter module 16 grants permission, the target module begins transmitting data to the requesting module. This is called a split-read process. The read valid signal 40 remains low (or high) while the target module transmits data. The read valid signal 40 transitions to high (or low) when the target module is finished transmitting data to the requesting module.

Power dissipation in an SOC is proportional to the clock frequency. Therefore, power dissipation is minimized by minimizing the clock frequency of the system bus in the SOC. A minimum sufficient clock frequency for an SOC is dependant on the amount of data movement and a number of current computations. Therefore, the minimum clock frequency that sufficiently supports all data traffic will change as the amount of data traffic changes.

In one conventional approach, a clock frequency of an SOC is set to a frequency that is sufficient to handle data traffic in a worst case scenario. However, in this case, power is unnecessarily dissipated when the data traffic in the SOC is lower.

SUMMARY

An integrated circuit is provided and includes a generator. The generator, based on a summation signal, generates a clock signal having a frequency. Multiple devices generate respective requests. Each of the requests requests transfer of data on a bus. Each of the devices is configured to, based on the frequency of the clock signal, transfer the data for the corresponding request on the bus. A summer receives the requests and based on a number of the requests being in an asserted state during a first period of time, generates the summation signal. A first module, based on the summation signal, increases a second period of time that a first request is in an asserted state. The second period of time is increased to include or overlap the first period of time. The summer, as a result of the increase, generates the summation signal further based on the first request.

In other features, a method is provided and includes: based on a summation signal, generating a clock signal having a frequency; generating requests respectively via devices, where each of the requests requests transfer of data on a bus; via each of the devices and based on the frequency of the clock signal, transfer the data for the corresponding request on the bus; and receiving the requests generated by the devices. The method further includes: generating the summation signal based on a number of the requests being in an asserted state during a first period of time; and based on the summation signal, increase a second period of time that a first request of one of the devices is in an asserted state, where the second period of time is increased to include or overlap the first period of time, and where, as a result of the increase in the second period of time, the summation signal is generated further based on the first request.

In other features, a dynamic clock frequency module for a system-on-chip (SOC) is provided and includes modules that communicate over a system bus according to the present invention includes a request evaluation module that receives requests to utilize the system bus from the modules. A frequency assignment module calculates a clock frequency value for the system bus based on the requests received by the request evaluation module.

In other features, the request evaluation module includes a summing module that generates a sum of requests between the modules. A pulse stretch module communicates with the summing module and increases a period of time that at least one of the requests is asserted. The pulse stretch module increases the period of time based on the sum. The pulse stretch module increases the period of time to an estimated transaction duration.

In still other features of the invention, a low pass filter has an input that communicates with the summing module and an output that communicates with the frequency assignment module. The low pass filter prevents changes to the clock frequency value when the sum at least one of increases and decreases for less than a predetermined period. The low pass filter is one of a linear filter and a median filter. A slew rate control module communicates with the frequency assignment module and adjusts at least one of a rate of increase and a rate of decrease in the clock frequency value.

In yet other features, only one of the modules utilizes the system bus at a time. A bus arbiter module that receives the request signals selectively grants the modules access to the system bus. The SOC is implemented in a wireless local area network (LAN) device. The wireless LAN device is compliant with one of IEEE 802.11, 802.11a, 802.11b, 802.11g, and 802.11n. The frequency assignment module transmits the clock frequency value to a clock generator, which adjusts a clock frequency of the system bus based thereon. An SOC comprises the dynamic clock frequency module, the modules, and the system bus.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION

Figure 1:
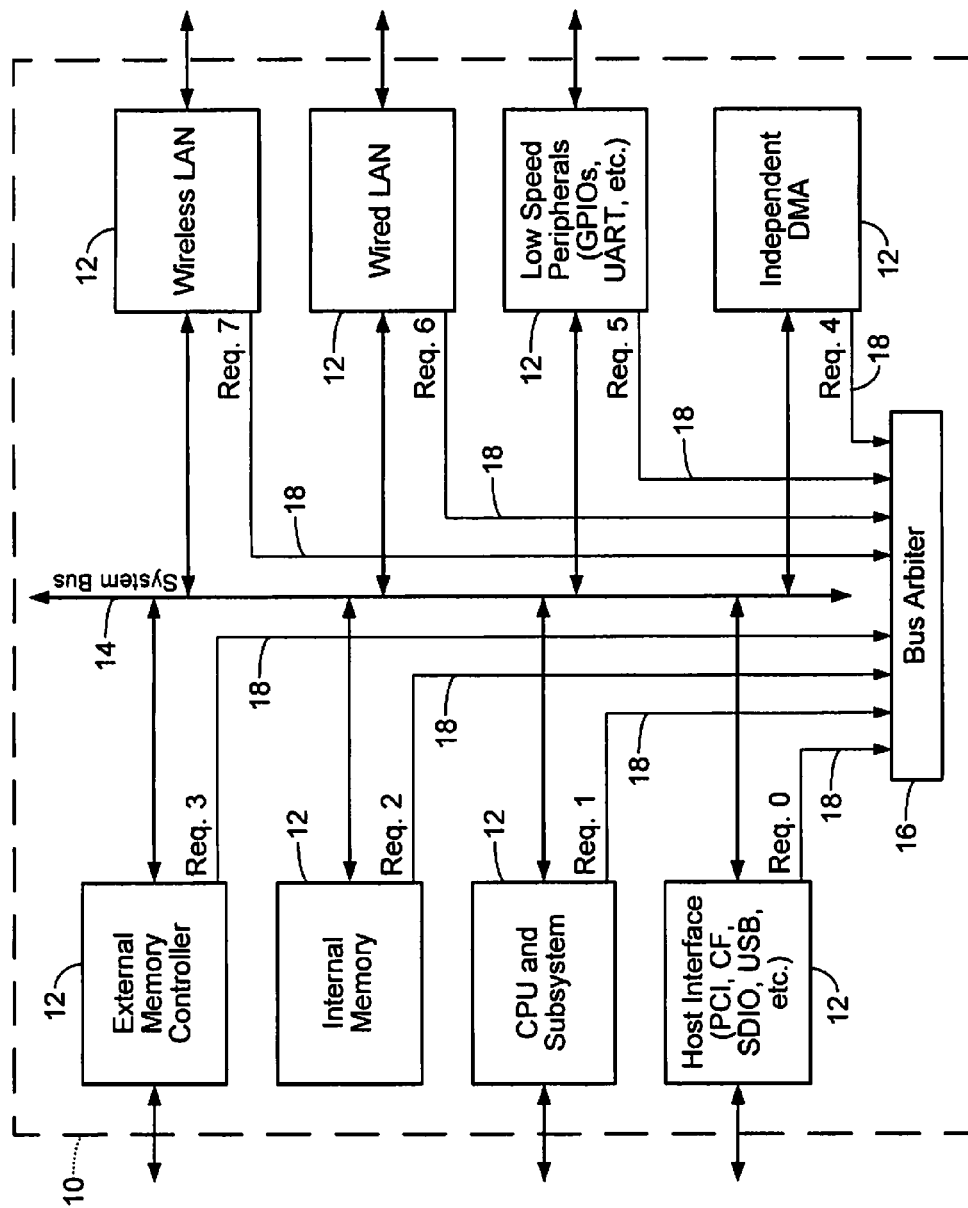
FIG. 1 is a functional block diagram of a system-on-chip (SOC) for a wireless network device according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Power dissipation in a system-on-chip (SOC) is minimized by minimizing the clock frequency of the system bus of the SOC. The clock frequency is dynamically changed according to the present invention based on the data traffic to reduce power consumption. Modules within the SOC assert request signals to request permission to use the system bus. The request signals are used to determine the number of outstanding transactions in the SOC. The clock frequency is adjusted based on the number of outstanding transactions. However, brief changes in clock frequency are undesirable. Therefore, the clock frequency is preferably not adjusted when short fluctuations in the number of outstanding requests occur. Additionally, changes to the clock frequency are limited in magnitude to reduce the change in current to which the voltage regulator responds.

Figure 3:
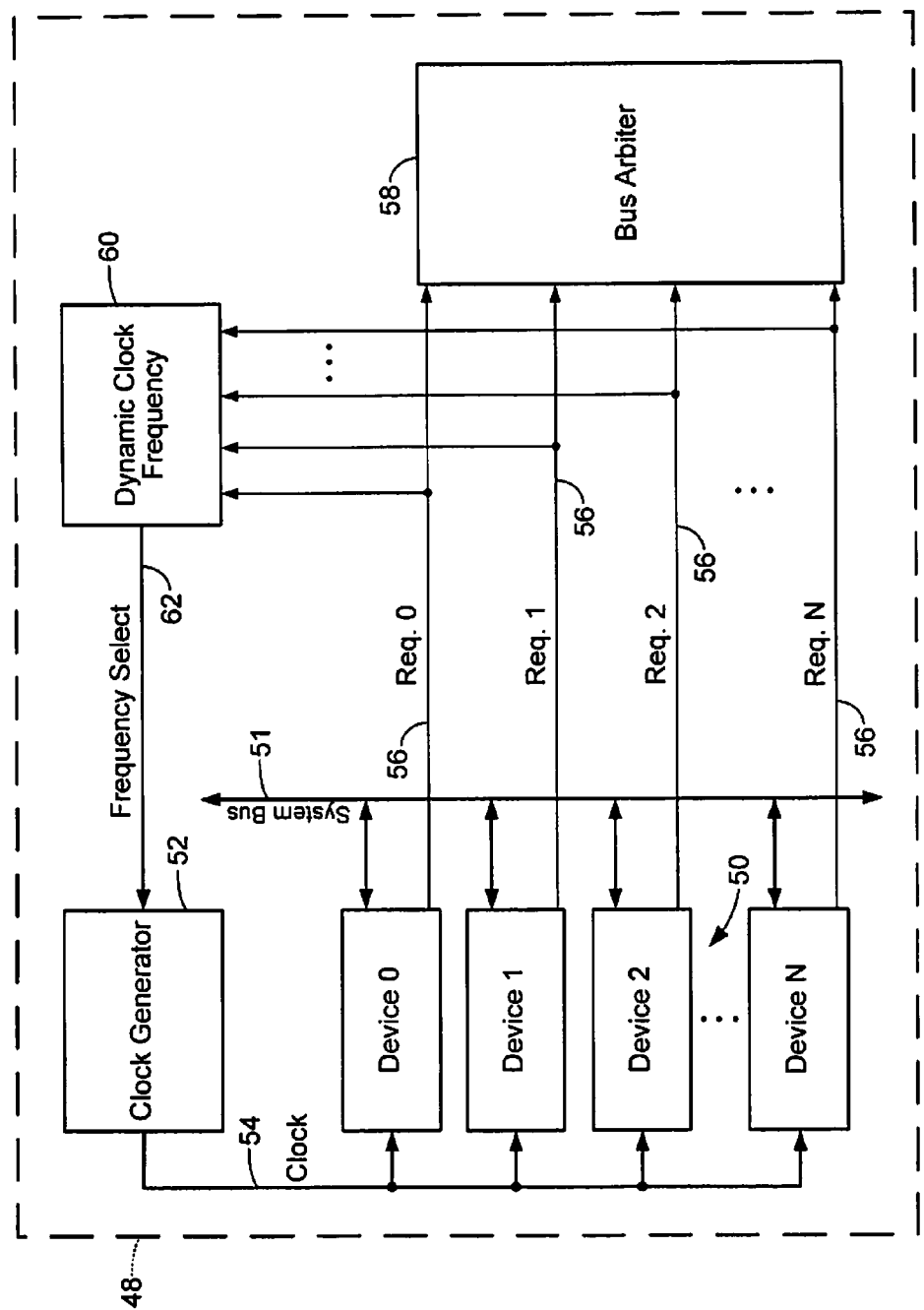
FIG. 3 is a functional block diagram of an SOC that includes a dynamic clock frequency module according to the present invention.

Referring now to FIG. 3, an SOC 48 includes N modules 50 that communicate with each other over a system bus 51. A clock generator 52 transmits a clock signal 54 to the modules 50. For example, the clock generator 52 may include a phase-locked loop (PLL) module, an external crystal oscillator (XOSC), and/or any other suitable clock generator. The clock signal 54 synchronizes the modules 50. The system bus 51 operates at the frequency of the clock signal 54. The modules 50 transmit request signals 56 to a bus arbiter module 58. The modules 50 assert request signals 56 to request permission from the bus arbiter module 58 to use the system bus 51.

A dynamic clock frequency module 60 according to the present invention also receives the request signals 56. The dynamic clock frequency module 60 determines the number of outstanding transactions based on the request signals 56.

The dynamic clock frequency module 60 determines a clock frequency value based on the number of outstanding transactions. The clock frequency value has a minimum frequency that is sufficient to manage the current amount of data traffic in the SOC 48. The dynamic clock frequency module 60 transmits a frequency select signal 62 to the clock generator 52. The clock generator 52 adjusts the clock frequency of the system bus 51 based on the frequency select signal 62.

Figure 4:
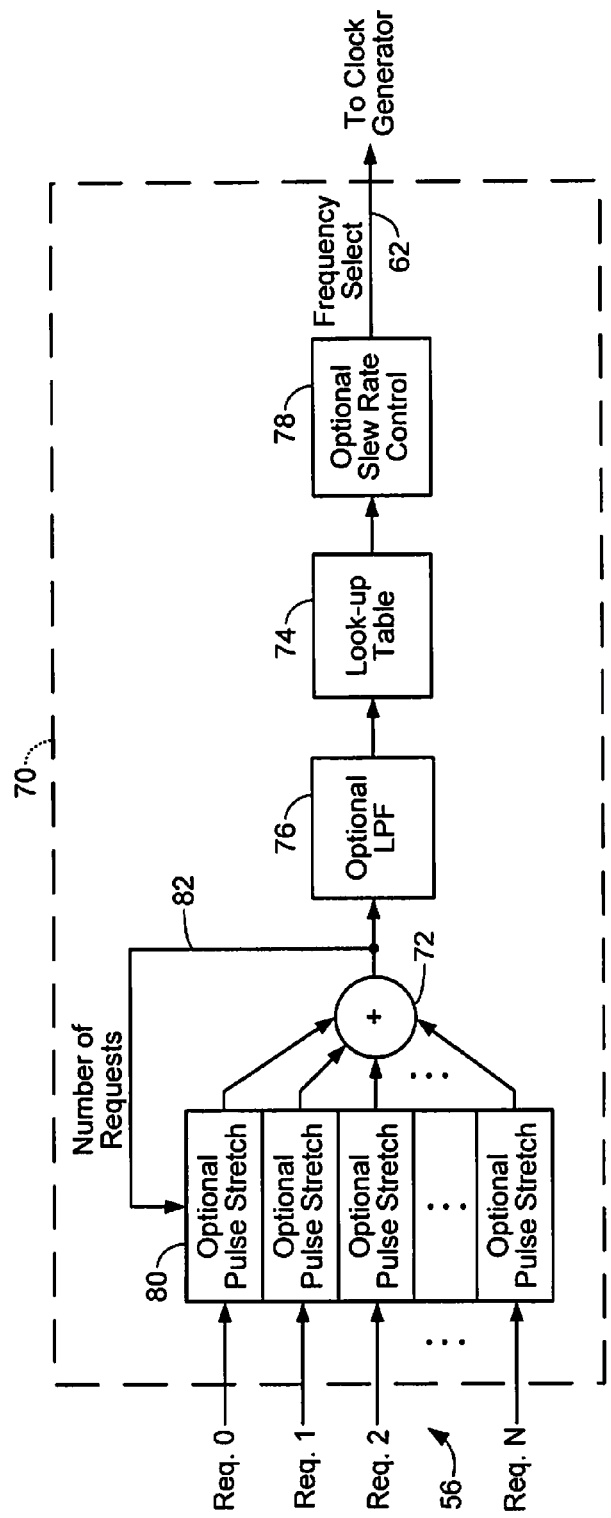
FIG. 4 is a functional block diagram of a dynamic clock frequency module that includes a pulse stretch module.

Referring now to FIG. 4, an exemplary dynamic clock frequency module 70 includes a summing module 72 that sums the request signals 56 from the modules 50 in the SOC 48. Therefore, an output of the summing module 72 indicates the number of outstanding requests. An input of a look-up table 74 receives the signal from the summing module 72. The look-up table 74 assigns a corresponding output value to each input value and outputs the corresponding output value on the frequency select signal 62. Therefore, each number of outstanding requests corresponds to a frequency value. However, the output values are not necessarily unique to each input value. For example, a range in the number of outstanding requests may correspond with a single output value.

When the number of outstanding requests is low, there is a small amount of data that needs to be transmitted between modules 50. Therefore, the system bus 51 can operate at a lower clock frequency without sacrificing performance. When the number of outstanding requests is high, there is a large amount of data that needs to be transmitted between modules 50. In this case, the clock frequency of the system bus 51 is increased to prevent significant delays in data transmissions. As can be appreciated, a mathematic formula or other methods may be used instead of the lookup table 74.

Brief variations in supply current from a voltage regulator that regulates voltage for the SOC 48 can cause performance degradation. Also, little power is saved from brief reductions in the clock frequency of the system bus 51. Therefore, the dynamic clock frequency module 70 optionally includes a low pass filter 76 having an input that communicates with the summing module 72 and an output that communicates with the look-up table 74. The low pass filter 76 prevents changes in the clock frequency due to brief changes in the number of outstanding requests.

The low pass filter 76 filters out changes in the number of outstanding requests that occur for less than a predetermined time period. The low pass filter 76 may be any conventional type of low pass filter. For example, the low pass filter 76 may be a median filter that stores prior samples and outputs a median value of the prior samples. The low pass filter 76 may also be a linear filter that averages prior samples and outputs the average. A low pass filter 76 may also assign weighting factors to specific positions of samples in a list of previous samples. Still other filters can be employed.

If the number of outstanding requests increases from a very low value to a very high value, the look-up table 74 detects the increase and increases the clock frequency of the system bus 51. However, if a sharp change in frequency occurs, current drawn from a voltage regulator that regulates power for the SOC 48 also changes sharply. Some voltage regulators are sensitive to sharp changes in load current and have trouble settling and/or maintaining a voltage when the sharp changes occur. Therefore, the dynamic clock frequency module 70 optionally includes a slew rate control module 78 that communicates with the look-up table 74.

The slew rate control module 78 controls the rate of change in the value of frequency select signal 62. The slew rate control module 78 adjusts the rate of increase and/or decrease in the value of the frequency select signal 62. The slew rate control module 78 may also set a minimum time that the frequency select signal 62 remains at a given frequency before changing to a new value.

While both the low pass filter 76 and the slew rate control module 78 are optional modules, either module may be utilized individually or both modules may be utilized simultaneously. For example, a median low pass filter that is used in combination with a slew rate control module 78 provides a significant level of control over the operation of the dynamic clock frequency module 70.

Figure 2A:
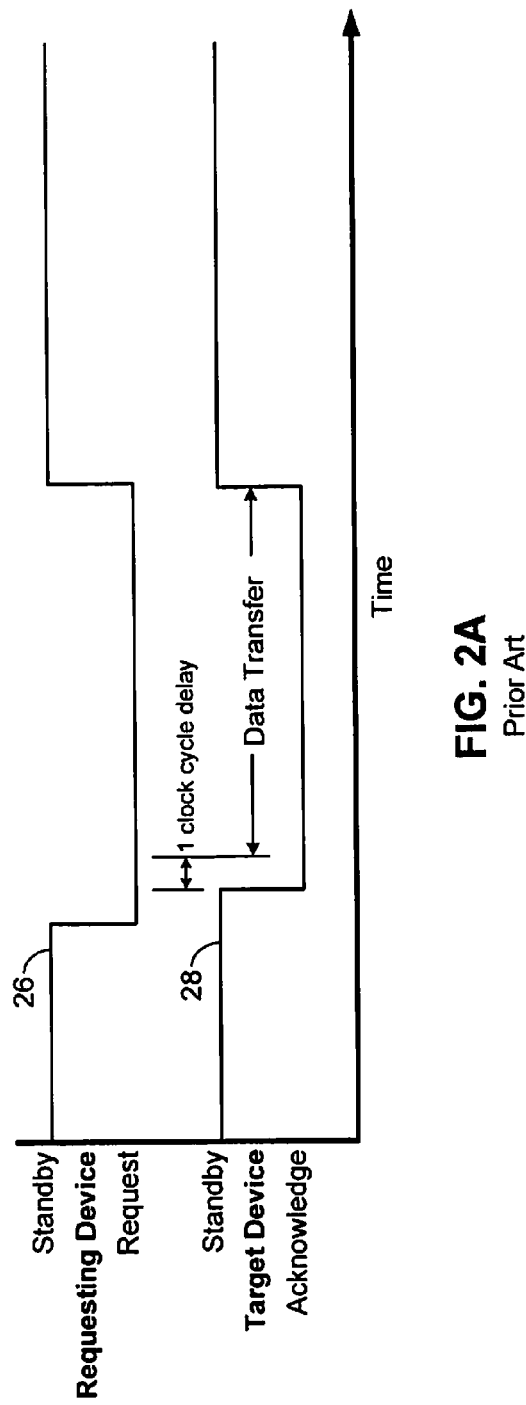
FIG. 2A is a timing diagram that illustrates a write transaction between modules in the SOC according to the prior art.
Figure 2B:
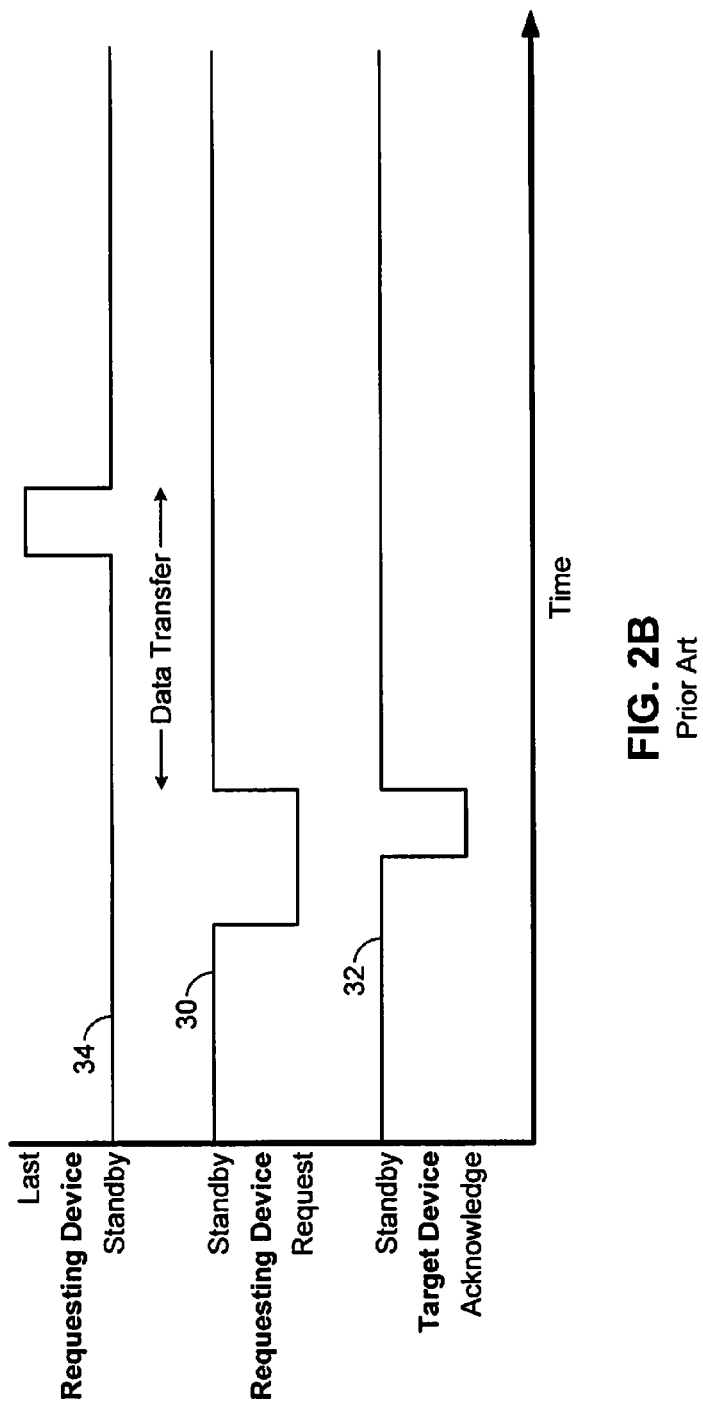
FIG. 2B is a timing diagram that illustrates a write transaction between modules in the SOC when the request signal is not present during the entire transaction according to the prior art.
Figure 2C:
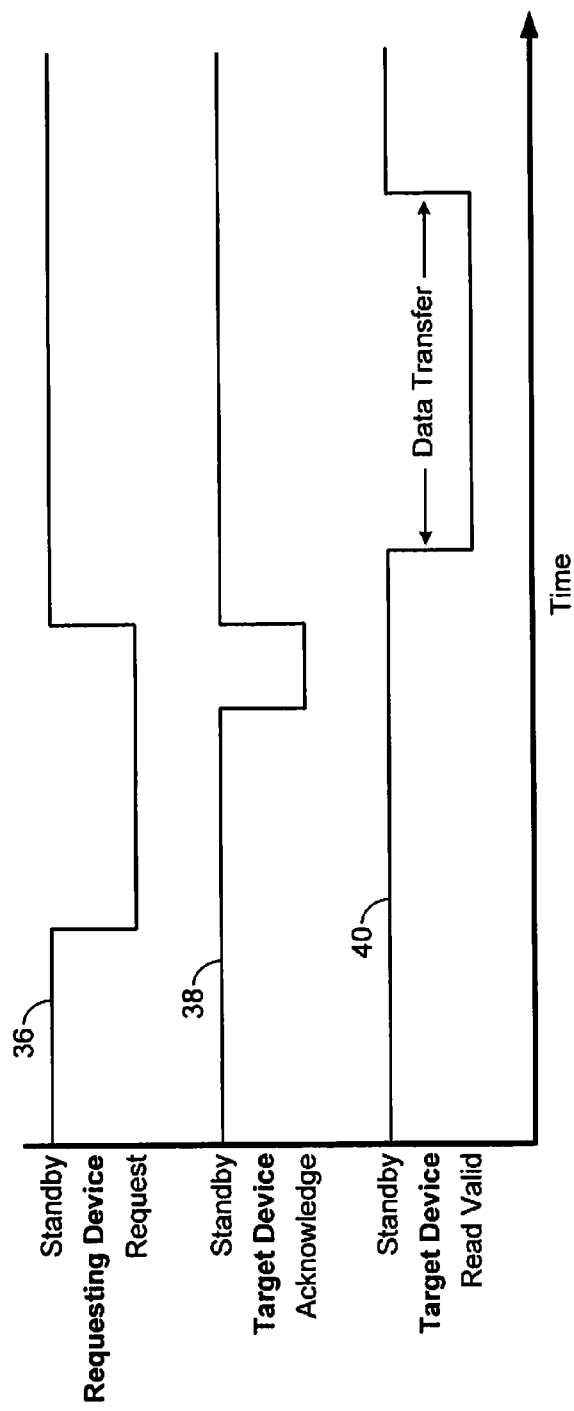
FIG. 2C is a timing diagram that illustrates a read transaction between modules in the SOC according to the prior art.

As illustrated in FIGS. 2B and 2C, request signals 56 do not always remain asserted for the entire duration of a transaction. For example, during read transactions, request signals 56 remain asserted until an acknowledge signal is asserted. The request signal is not asserted while the target module is actually transmitting data to the requesting module. Therefore, the number of outstanding transactions that the look-up table 74 detects is not accurate while at least one module is executing a read transaction. Therefore, the dynamic clock frequency module 70 optionally includes a pulse stretch module 80 that communicates with the summing module 72.

The pulse stretch module 80 detects when one of the request signals 56 is asserted and increases the amount of time that the request signal 56 is asserted to an estimated transaction time. For example, the pulse stretch module 80 increases the amount of time to an average write and/or read transaction time. In the event that there are at least two other outstanding transactions, increasing the amount of time that the request signal 56 is asserted to a single average transaction time is insufficient. Therefore, the pulse stretch module 80 preferably receives a feedback signal 82 from the output of the summing module 72.

The feedback signal 82 indicates the current number of outstanding transactions. This allows the pulse stretch module 80 to increase the amount of time that a request signal is asserted to a single average transaction time plus the average transaction time multiplied by the number of other outstanding transactions. For example, if there are four other outstanding transactions at a given time, the pulse stretch module 80 increases the time that a new request signal is asserted to five average transaction times. This allows the look-up table 74 to accurately detect the number of outstanding transactions when the request signal of at least one outstanding transaction does not remain asserted for the entire duration of the transaction. This also allows the look-up table 74 to adjust the clock frequency of the system bus 51 to appropriate levels at all times.

Figure 5:
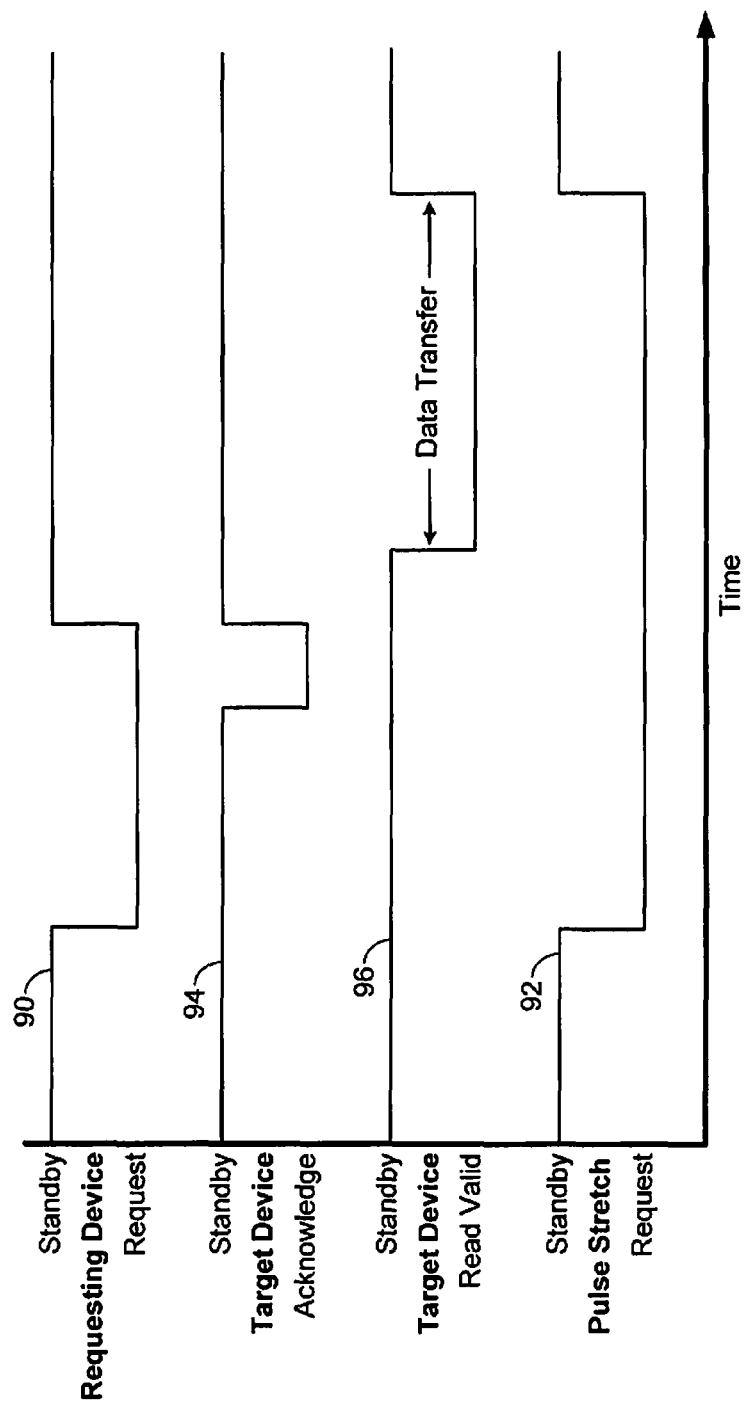
FIG. 5 is a timing diagram that illustrates a read transaction with a pulse stretch module that increases the period that the request signal is asserted.

Referring now to FIG. 5, operation of the pulse stretch module 80 is illustrated. When a request signal 90 for a requesting module on a read transaction is asserted, an output signal 92 of the pulse stretch module 80 is also asserted. At this time, the pulse stretch module 80 determines the current number of outstanding transactions. In the scenario illustrated in FIG. 5, there are no additional outstanding transactions. Therefore, the output signal 92 of the pulse stretch module 80 is asserted for a single average transaction time.

When a target module asserts an acknowledge signal 94, both the request signal 90 and the acknowledge signal 94 transition to high (or low). However, the output signal 92 of the pulse stretch module 80 remains asserted so that the look-up table 74 may accurately detect the number of outstanding transactions. The target module does not begin transmitting data to the requesting module until a read valid signal 96 is asserted. Without the pulse stretch module 80, the look-up table 74 detects the end of the current transaction when the request signal 90 transitions to high (or low). This occurs before any data is actually transmitted to the requesting module.

Figure 6:
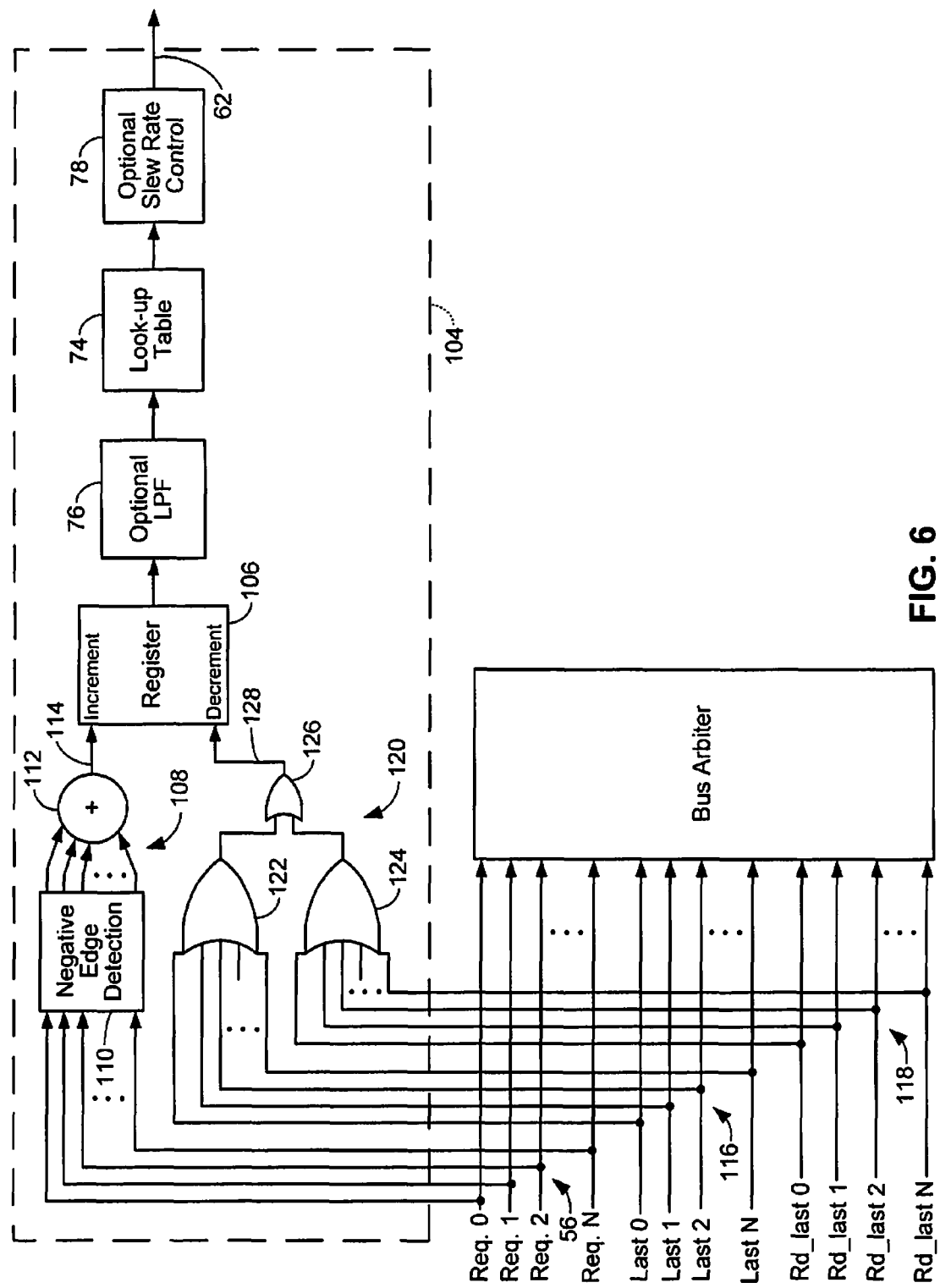
FIG. 6 is a functional block diagram of a dynamic clock frequency module that detects a number of outstanding transactions between modules in an SOC.

Referring now to FIG. 6, an exemplary dynamic clock frequency module 104 includes a register 106 or other memory device before the look-up table 74. The register 106 indicates a current number of outstanding transactions between the modules 50. The register 106 includes two inputs. The register 106 is incremented when a signal at the first input of the register 106 is asserted. The register 106 is decremented when a signal at the second input of the register 106 is asserted. The request signals 56 are input to a request detection circuit 108. The request detection circuit 108 includes a negative edge detection module 110 and a summing module 112.

The negative edge detection module 110 asserts a corresponding output signal when one of the request signals 56 is asserted. For example, if the request signals 56 are active low, the negative edge detection module 110 asserts a corresponding output signal when one of the request signals 56 transitions to low (or high). The summing module 112 sums outputs of the negative edge detection module 110. This ensures that the register 106 is incremented for each of the request signals 56 that are asserted when multiple request signals 56 are simultaneously asserted. An output signal 114 of the summing module 112 is received by the first input of the register 106.

In addition to the request signals 56, the bus arbiter module 58 also receives write last and read last signals 116 and 118, respectively, from the modules 50. Write last signals 116 are asserted at conclusions of write transactions. For example, a rising edge of an acknowledge signal in a write transaction indicates the end of the transaction. Read last signals 118 are asserted at conclusions of read transactions. The write last and read last signals 116 and 118, respectively, are also input to a transaction detection circuit 120. The transaction detection circuit 120 includes first, second, and third logic OR gates 122, 124, and 126, respectively.

The first logic OR gate 122 receives the write last signals 116, and the second logic OR gate 124 receives the read last signals 118. An output of the first logic OR gate 122 is transmitted to a first input of the third logic OR gate 126, and an output of the second logic OR gate 124 is transmitted to a second input of the third logic OR gate 126. An output signal 128 of the third logic OR gate 126 is received by the second input of the register 106. Since only one transaction may end at a time, a summing module is not required in the transaction detection circuit 120.

When any one of the write last and read last signals 116 and 118, respectively, are asserted, the output of the third logic OR gate 126 is asserted, which decrements the register 106. While three logic OR gates are shown in the transaction detection circuit 120 of FIG. 6, a single logic OR gate with a sufficient number of inputs, additional logic OR gates, and/or other types of logic gates may be used. Therefore, the register 106 retains an accurate count of the number of outstanding transactions. Additionally, average transaction time estimations that occur with configurations including pulse stretch modules are avoided.

Figure 7:
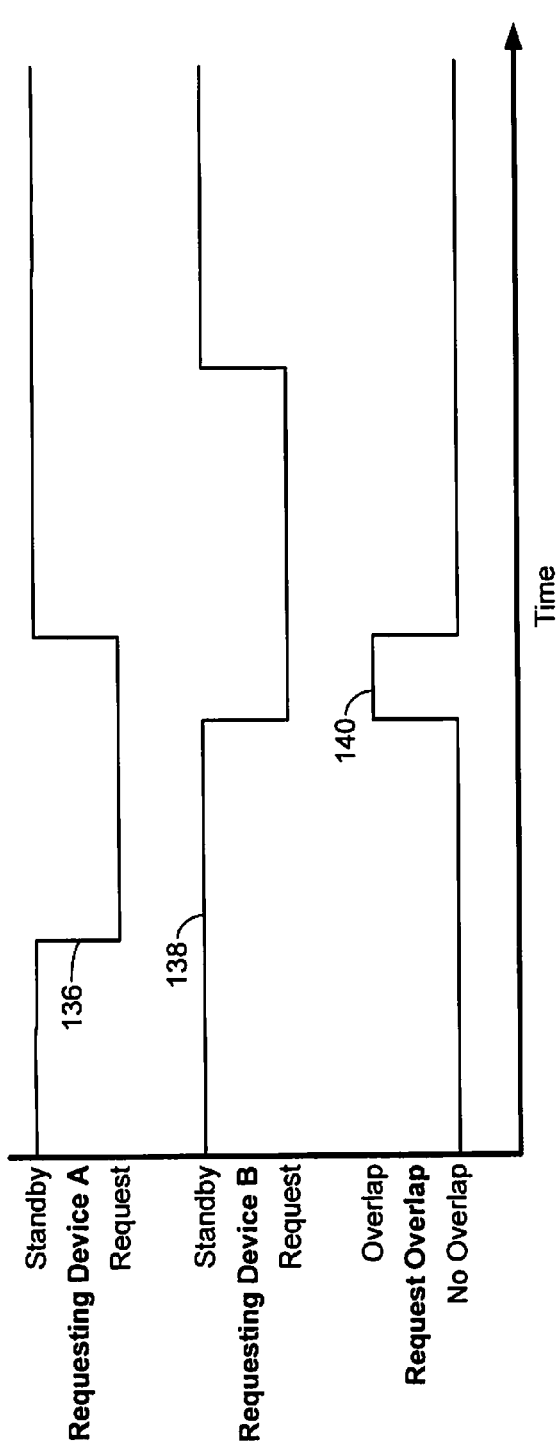
FIG. 7 is a timing diagram that illustrates brief changes in a number of outstanding transactions between modules in an SOC.

Referring now to FIG. 7, the low pass filter 76 preferably filters brief increases in the number of outstanding transactions. First and second request signals 136 and 138, respectively, are both asserted for only a brief period of time. An overlap signal 140 indicates when both the first and second request signals 136 and 138, respectively, are asserted. The low pass filter 76 prevents the look-up table 74 from detecting the brief overlap period and unnecessarily increasing the clock frequency of the system bus 51.

Figure 8:
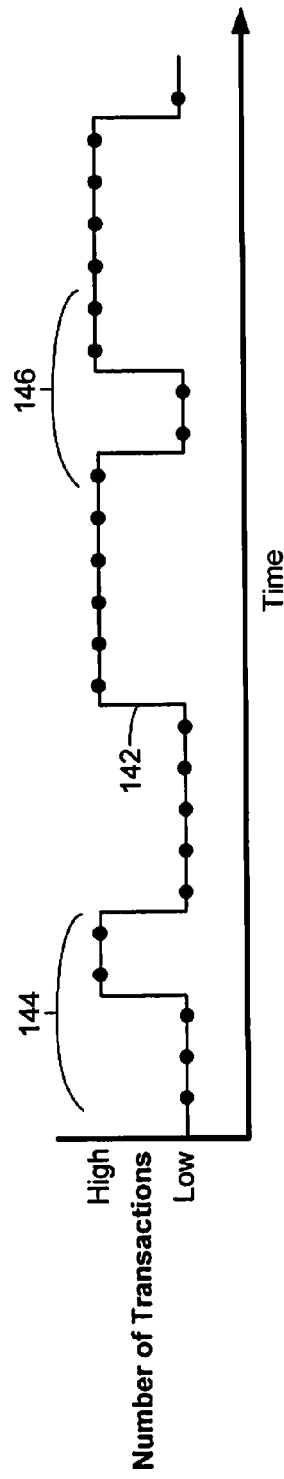
FIG. 8 is a timing diagram that illustrates operation of a median low pass filter in the dynamic clock frequency module.

Referring now to FIG. 8, a median low pass filter examines the prior number of samples of outstanding transactions. The median low pass filter outputs the middle value when the samples are arranged in an increasing order. An exemplary signal 142 illustrated in FIG. 8 alternates between a high and a low number for varying periods of time. A median low pass filter may be programmed to remove pulses within a specific pulse width range. For example, a median low pass filter may be programmed to filter out pulses that are two samples wide or smaller. This may be accomplished by programming the median low pass filter to examine five or more prior samples at a time. For example, if the first five samples, illustrated at 144, in FIG. 8 are examined and organized in an increasing order, the median value is the low value.

The median low pass filter prevents the look-up table 74 from detecting the brief increase in the number of outstanding transactions. Similarly, if five samples that include a pair of low values, illustrated at 146, are examined and organized in an increasing order, the median value is the high value. The median low pass filter prevents the look-up table 74 from detecting the brief decrease in the number of outstanding transactions. Therefore, a median low pass filter is very effective at filtering out pulses in digital signals.

In order to implement a dynamic clock frequency system, the look-up table 74 adjusts the clock frequency of the system bus 51 while remaining synchronized with the modules 50. Therefore, clock multiplexer (MUX) circuits are preferably employed to ensure that a current clock is disabled and a new clock is enabled at the same point in the clock cycle.

The present invention reduces power dissipation in SOCs, which are typically included in battery powered wireless network devices. The dynamic clock frequency module dynamically adjusts the clock frequency of a system bus based on a number of outstanding transactions between modules in the SOC. This allows the clock frequency to remain as low as possible while retaining a minimum level of performance for modules that are currently using the system bus.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. An integrated circuit comprising:
   a generator configured to, based on a summation signal, generate a clock signal having a frequency;
   a plurality of devices configured to generate respective requests, wherein each of the requests requests transfer of data on a bus, and wherein each of the plurality of devices is configured to, based on the frequency of the clock signal, transfer the data for the corresponding request on the bus;
   a summer configured to (i) receive the requests generated by the plurality of devices, and (ii) generate the summation signal based on a number of the requests being in an asserted state during a first period of time; and
   a first module configured to, based on the summation signal, increase a second period of time that a first request of one of the plurality of devices is in an asserted state, wherein the second period of time is increased to include or overlap the first period of time, and
   wherein the summer is configured to, as a result of the increase in the second period of time, generate the summation signal further based on the first request.

2. The integrated circuit of claim 1, further comprising a frequency module configured to, based on the summation signal, adjust the frequency of the clock signal between a plurality of non-zero frequencies.

3. The integrated circuit of claim 2, further comprising a slew rate module configured to, based on the summation signal, adjust a rate at which the frequency of the clock signal is adjusted by the generator or the frequency module.

4. The integrated circuit of claim 1, wherein the first module is configured to lengthen a pulse of an output of the first module to increase the second period of time.

5. The integrated circuit of claim 1, further comprising a second module configured to, based on the summation signal, increase a third period of time, wherein:
a second request is in an asserted state for the third period of time; and
the third period of time (i) includes or overlaps the first period of time, and (ii) overlaps the second period of time.

6. The integrated circuit of claim 5, further comprising a plurality of modules, wherein the plurality of modules include the first module and the second module.

7. The integrated circuit of claim 1, further comprising a filter configured to prevent a change to the frequency of the clock signal if the summation signal increases or decreases for less than a predetermined period of time.

8. The integrated circuit of claim 1, further comprising a plurality of modules, wherein:
the plurality of modules include the first module;
each of the plurality of modules is configured to, based on an average transaction time, (i) detect when a respective one of the requests is in an asserted state, and (ii) increase an amount of time the corresponding one of the requests is in an asserted state; and
the average transaction time is an average amount of time to perform a plurality of read transactions or a plurality of write transactions.

9. The integrated circuit of claim 8, wherein each of the plurality of modules are configured to increase the amount of time of the corresponding one of the requests based on a product of (i) the average transaction time, and (ii) the number of the requests being in an asserted state during the first period of time.

10. The integrated circuit of claim 1, further comprising:
a plurality of modules configured to receive the requests respectively from the plurality of devices, wherein the plurality of modules include the first module; and
a bus arbiter configured to grant access to the bus to each of the plurality of devices during respective periods of time.

11. A method comprising:
based on a summation signal, generating a clock signal having a frequency;
generating requests respectively via a plurality of devices, wherein each of the requests requests transfer of data on a bus;
via each of the plurality of devices and based on the frequency of the clock signal, transfer the data for the corresponding request on the bus;
receiving the requests generated by the plurality of devices;
generating the summation signal based on a number of the requests being in an asserted state during a first period of time; and
based on the summation signal, increase a second period of time that a first request of one of the plurality of devices is in an asserted state, wherein the second period of time is increased to include or overlap the first period of time, and
wherein, as a result of the increase in the second period of time, the summation signal is generated further based on the first request.

12. The method of claim 11, further comprising, based on the summation signal, adjusting the frequency of the clock signal between a plurality of non-zero frequencies.

13. The method of claim 12, further comprising, based on the summation signal, adjusting a rate at which the frequency of the clock signal is adjusted.

14. The method of claim 11, further comprising lengthening a pulse corresponding to the first request to increase the second period of time.

15. The method of claim 11, further comprising, based on the summation signal, increasing a third period of time, wherein:
a second request is in an asserted state for the third period of time; and
the third period of time (i) includes or overlaps the first period of time, and (ii) overlaps the second period of time.

16. The method of claim 11, further comprising:
based on the summation signal, adjusting a plurality of pulses corresponding respectively to the requests; and
generating the summation signal based on the plurality of pulses.

17. The method of claim 11, further comprising preventing a change to the frequency of the clock signal if the summation signal increases or decreases for less than a predetermined period of time.

18. The method of claim 11, further comprising, via each of a plurality of modules and based on an average transaction time, (i) detecting when a respective one of the requests is in an asserted state, and (ii) increasing an amount of time the corresponding one of the requests is in an asserted state, wherein the average transaction time is an average amount of time to perform a plurality of read transactions or a plurality of write transactions.

19. The method of claim 18, wherein, via each of the plurality of modules, increasing the amount of time of the corresponding one of the requests based on a product of (i) the average transaction time, and (ii) the number of the requests being in an asserted state during the first period of time.

20. The method of claim 11, further comprising:
via a plurality of modules, receiving the requests respectively from the plurality of devices; and
granting access to the bus to each of the plurality of devices during respective periods of time.

* * * * *